United States Patent
Liu et al.

(10) Patent No.: US 11,816,939 B2
(45) Date of Patent: Nov. 14, 2023

(54) ROLLOVER ALARMING SYSTEM, ROLLOVER RISK PREDICTION METHOD, AND ROLLOVER ALARMING METHOD

(71) Applicant: JIANGSU XCMG CONSTRUCTION MACHINERY RESEARCH INSTITUTE LTD., Jiangsu (CN)

(72) Inventors: Chunlei Liu, Jiangsu (CN); Yanbo Geng, Jiangsu (CN); Li Wang, Jiangsu (CN)

(73) Assignee: JIANGSU XCMG CONSTRUCTION MACHINERY RESEARCH INSTITUTE LTD., Jiangsu (CN)

( * ) Notice: Subject to any disclaimer, the term of this patent is extended or adjusted under 35 U.S.C. 154(b) by 309 days.

(21) Appl. No.: 17/278,768

(22) PCT Filed: Jun. 2, 2020

(86) PCT No.: PCT/CN2020/094012
§ 371 (c)(1),
(2) Date: Mar. 23, 2021

(87) PCT Pub. No.: WO2020/211882
PCT Pub. Date: Oct. 22, 2020

(65) Prior Publication Data
US 2022/0036671 A1 Feb. 3, 2022

(30) Foreign Application Priority Data
Sep. 24, 2019 (CN) .......................... 201910902501.1

(51) Int. Cl.
*B60Q 1/00* (2006.01)
*G07C 5/08* (2006.01)
(Continued)

(52) U.S. Cl.
CPC ............. *G07C 5/0833* (2013.01); *G01B 7/18* (2013.01); *G07C 5/085* (2013.01); *G07C 5/0825* (2013.01); *G08B 7/06* (2013.01)

(58) Field of Classification Search
CPC .... G07C 5/0833; G07C 5/0825; G07C 5/085; G01B 7/18; G08B 7/06; B60W 40/112;
(Continued)

(56) References Cited

U.S. PATENT DOCUMENTS 5,610,575 A    3/1997   Gioutsos
5,825,284 A * 10/1998   Dunwoody ........... G01M 1/122
                                                                       340/440

(Continued)

FOREIGN PATENT DOCUMENTS

CN         101336183 A     12/2008
CN         101402363 A      4/2009
(Continued)

OTHER PUBLICATIONS

First Office Action and Search Report for Chinese Patent Application No. 201910902501.1 (English translation, 16 pages).
(Continued)

*Primary Examiner* — Anh V La
(74) *Attorney, Agent, or Firm* — Merchant & Gould P.C.

(57) ABSTRACT

A rollover alarming system, a rollover risk prediction method, and a rollover alarming method. An axle housing strain measurement unit measures strain values on both sides of an axle housing of a vehicle body. A roll angle measurement unit measures a roll angle of the vehicle body. A collection control unit is configured to collect the strain values on both sides of the axle housing of the vehicle body and the roll angle of the vehicle body, calculate a strain difference between the strain values according to the strain values on both sides of the axle housing of the vehicle body,
(Continued)

and output a corresponding alarm control signal according to the strain difference between both sides of the axle housing of the vehicle body and the roll angle of the vehicle body. An alarm unit is configured to output a corresponding alarm signal according to the received alarm control signal.

10 Claims, 3 Drawing Sheets

(51) Int. Cl.
*G01B 7/16* (2006.01)
*G08B 7/06* (2006.01)

(58) Field of Classification Search
CPC ........... B60W 50/14; B60W 2030/043; B60W 2050/143; B60W 2050/146; B60W 2300/152; B60W 2300/17; B60W 2420/22; B60W 2422/00; B60W 2520/18; B60W 30/04
USPC .................. 340/440, 439, 438, 425.5, 456
See application file for complete search history.

(56) References Cited

U.S. PATENT DOCUMENTS

| | | | |
|---|---|---|---|
| 2003/0182042 A1* | 9/2003 | Watson | B60R 21/01552 701/45 |
| 2008/0272899 A1 | 11/2008 | Penzotti | |
| 2009/0093928 A1 | 4/2009 | Getman et al. | |
| 2009/0164060 A1 | 6/2009 | Fortson et al. | |
| 2010/0191423 A1 | 7/2010 | Koyama et al. | |
| 2011/0257860 A1 | 10/2011 | Getman et al. | |
| 2012/0313769 A1* | 12/2012 | Holbert | B60W 40/112 340/440 |
| 2013/0151075 A1 | 6/2013 | Moshchuk et al. | |
| 2015/0127212 A1* | 5/2015 | Chacon | G05D 1/0011 701/32.4 |
| 2015/0134437 A1 | 5/2015 | Watanabe et al. | |
| 2018/0111606 A1* | 4/2018 | Giorgio Bort | B60W 30/04 |
| 2018/0162410 A1 | 6/2018 | Skillsater et al. | |
| 2020/0269854 A1 | 8/2020 | Wei et al. | |

FOREIGN PATENT DOCUMENTS

| | | |
|---|---|---|
| CN | 102756686 A | 10/2012 |
| CN | 203391769 U | 1/2014 |
| CN | 204679143 U | 9/2015 |
| CN | 205417165 U | 8/2016 |
| CN | 106945659 A | 7/2017 |
| CN | 104865079 B | 4/2018 |
| CN | 108099919 A | 6/2018 |
| CN | 110667568 A | 1/2020 |
| EP | 1980463 A1 | 10/2008 |
| EP | 2045155 A1 | 4/2009 |
| EP | 3072846 A1 | 9/2016 |
| EP | 3569463 A1 | 11/2019 |
| JP | 2014-130651 A | 7/2014 |
| WO | 2012-170628 A2 | 12/2012 |

OTHER PUBLICATIONS

Second Office Action and Search Report for Chinese Patent Application No. 201910902501.1 (English translation, 17 pages).
International Search Report issued in corresponding International Patent Application No. PCT/CN2020/094012, dated Jun. 30, 2020, 11 pages.
Extended European Search Report issued in corresponding International Patent Application No. PCT/CN2020/094012, dated Oct. 18, 2022, (10 pages).

* cited by examiner

ROLLOVER ALARMING SYSTEM, ROLLOVER RISK PREDICTION METHOD, AND ROLLOVER ALARMING METHOD

CROSS-REFERENCE TO RELATED APPLICATIONS

This application is a National Stage Application of PCT/CN2020/094012 filed on Jun. 2, 2020, which claims benefit of Serial No. 201910902501.1, filed Sep. 24, 2019 in China, and which applications are incorporated herein by reference. To the extent appropriate, a claim of priority is made to each of the above disclosed applications.

TECHNICAL FIELD

The present disclosure relates to the technical field of construction machinery, and in particular to a rollover alarming system, a rollover risk prediction method, and a rollover alarming method.

BACKGROUND

As a modern construction device, construction machinery is widely applied in transportation, energy development, building construction, mining exploitation, agro-forestry, aqua-forestry, national defense construction and other fields. Since the construction machinery is operated in harsh working conditions and used in complex and volatile working conditions, rollover accidents are inevitable, thereby rendering great disasters to users and producing huge economic losses. Construction machinery enterprises home and abroad invested a large amount of resources in the development and design of the rollover protection structure (ROPS) of the cab, and achieved certain technical results. This is a protection mechanism after occurrence of a rollover accident, in which requirements are mainly raised for the amount of structural deformation of the cab.

SUMMARY

The above-described technical object of the present disclosure is achieved by the following technical solution:

The present disclosure provides a rollover alarming system, comprising: an axle housing strain measurement unit, configured to measure strain values on both sides of an axle housing of a vehicle body; a roll angle measurement unit, configured to measure a roll angle of the vehicle body; a collection control unit, configured to collect the strain values on both sides of the axle housing of the vehicle body and the roll angle of the vehicle body, calculate a strain difference between the strain values according to the strain values on both sides of the axle housing of the vehicle body, and output a corresponding alarm control signal according to the strain difference between both sides of the axle housing of the vehicle body and the roll angle of the vehicle body; and an alarm unit, configured to output a corresponding alarm signal according to the received alarm control signal.

In some embodiments, the axle housing strain measurement unit comprises a first strain gauge fixed to a left side of a front axle housing of the vehicle body, a second strain gauge fixed to a right side of the front axle housing of the vehicle body, a third strain gauge fixed to a left side of a rear axle housing of the vehicle body, and a fourth strain gauge fixed to a right side of the rear axle housing of the vehicle body.

In some embodiments, the roll angle measurement unit comprises a roll angle sensor of the vehicle body fixed on the main structure of the vehicle body.

In some embodiments, the main structure of the vehicle body comprises a rear axle housing of the vehicle body.

In some embodiments, the collection control unit comprises: a data collector, configured to collect the strain values on both sides of the axle housing of the vehicle body and the roll angle of the vehicle body; and a controller, configured to calculate a strain difference between the strain values according to the strain values on both sides of the axle housing of the vehicle body, and output a corresponding alarm control signal according to the strain difference between the strain values and the roll angle of the vehicle body.

In some embodiments, the alarm unit comprises a buzzer and an alarm light.

The present disclosure also provides a rollover risk prediction method, comprising: collecting strain values on both sides of an axle housing of a vehicle body and a roll angle of the vehicle body; calculating a strain difference between the strain values according to the strain values on both sides of the axle housing of the vehicle body; and comparing the strain difference between the strain values and the roll angle of the vehicle body with corresponding thresholds respectively, and outputting a corresponding rollover risk prediction result according to a comparison result.

In some embodiments, the step of outputting a corresponding rollover risk prediction result according to a comparison result comprises: if $|\varepsilon2-\varepsilon1|<\Delta1$ and $|\varepsilon4-\varepsilon3|<\Delta1$ and $\alpha<\delta1$, there is no rollover risk; if $|\varepsilon2-\varepsilon1|\geq\Delta1$ or $|\varepsilon4-\varepsilon3|\geq\Delta1$ or $\alpha\geq\delta1$, there is a low rollover risk; if $|\varepsilon2-\varepsilon1|\geq\Delta2$ or $|\varepsilon4-\varepsilon3|\geq\Delta2$ or $\alpha\geq\delta2$ or $|\varepsilon2-\varepsilon1|\geq\Delta1$ or $|\varepsilon4-\varepsilon3|\geq\Delta1$ and $\alpha\geq\delta1$, there is a high rollover risk, in the formulas: $\Delta1$ is 10% to 20% of an average strain on the axle housing, that is, 10% to 20% of $(\varepsilon1+\varepsilon2+\varepsilon3+\varepsilon4)/4$, $\Delta2$ is 20% to 30% of the average strain on the axle housing, that is, 20% to 30% of $(\varepsilon1+\varepsilon2+\varepsilon3+\varepsilon4)/4$, $\delta1$ is 10% to 20% of an included angle between a horizontal plane and a line connecting a vehicle body mass center and a vehicle wheel, and $\delta2$ is 20% to 40% of the included angle between the horizontal plane and the line connecting the vehicle body mass center and the vehicle wheel, $\alpha$ is the roll angle of the vehicle body, $\varepsilon1$ is a strain value on a left side of a front axle housing, $\varepsilon2$ is a strain value on a right side of the front axle housing, $\varepsilon3$ is a strain value on a left side of a rear axle housing, and $\varepsilon4$ is a strain value on a right side of the rear axle housing.

In some embodiments, the step of outputting a corresponding rollover risk prediction result according to a comparison result comprises: outputting a vehicle rollover risk prediction result that there is no rollover risk in the case where $|\varepsilon2-\varepsilon1|<\Delta1$ and $|\varepsilon4-\varepsilon3|\Delta1$ and $\alpha<\delta1$; outputting a vehicle rollover risk prediction result that there is a high rollover risk in the case where at least one of $|\varepsilon2-\varepsilon1|\geq\Delta2$ or $|\varepsilon4-\varepsilon3|\geq\Delta2$ or $\alpha\delta2$ is satisfied, or in the case where at least one of $|\varepsilon2-\varepsilon1|\geq\Delta1$ or $|\varepsilon4-\varepsilon3|\geq\Delta1$ is satisfied, and $\alpha\geq\delta1$ is satisfied; and outputting a vehicle rollover risk prediction result that there is a low rollover risk in other cases, wherein $\varepsilon1$ is a strain value on a left side of the front axle housing of the vehicle body, $\varepsilon2$ is a strain value on a right side of a front axle housing of the vehicle body, $\varepsilon3$ is a strain value on a left side of a rear axle housing of the vehicle body, $\varepsilon4$ is a strain value on a right side of the rear axle housing of the vehicle body, $\Delta1=(\varepsilon1+\varepsilon2+\varepsilon3+\varepsilon4)\times k1/4$, $k1$ has a value range of [0.1, 0.2], $\Delta2=(\varepsilon1+\varepsilon2+\varepsilon3+\varepsilon4)\times k2/4$, $k2$ has a value range of [0.2, 0.3], $\delta1=\theta\times k3$, $\theta$ is an included angle between a horizontal plane and a plane determined by a vehicle body mass center and a vehicle wheel, k3 has a value range of [0.1, 0.2], δ2=θ×k4, k4 has a value range of [0.2, 0.4], and α is a roll angle of the vehicle body.

The present disclosure further provides a rollover alarming method, comprising the steps that: predicting a rollover risk using the foregoing rollover risk prediction method; not activating a warning unit if there is a rollover risk prediction result of no rollover risk; warning, by the warning unit, at a long interval and flashing a yellow warning light if there is a rollover risk prediction result of a low rollover risk, wherein the long interval is no less than 10 seconds; and warning, by the warning unit, at a short interval and flashing a red warning light if there is a rollover risk prediction result of a high rollover risk, wherein the short interval is no more than 5 seconds.

Figure 1:
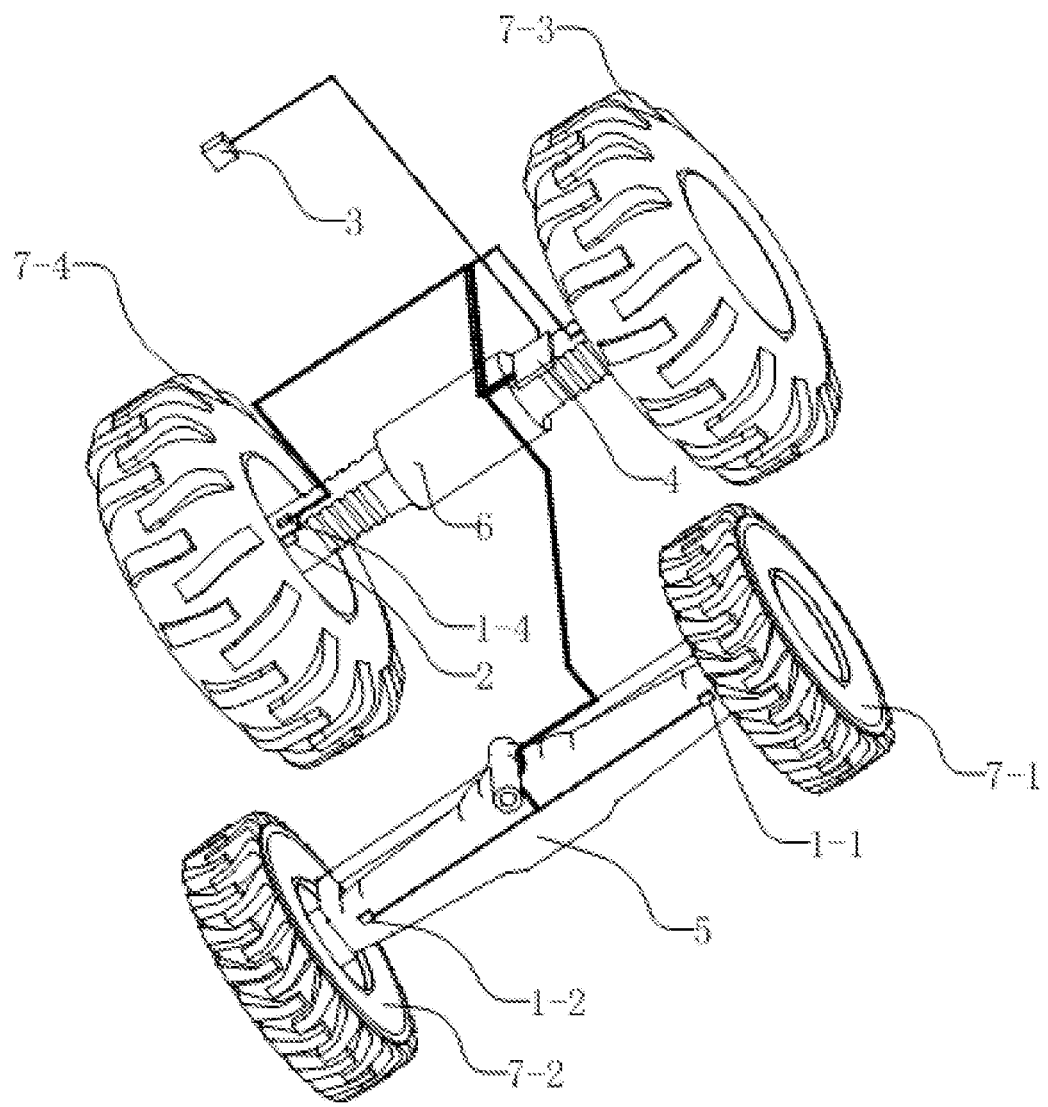
FIG. 1 is a schematic view of a mounting structure of the rollover alarming system provided according to embodiments of the present disclosure.

In the accompanying drawings: 1-1. first strain gauge; 1-2. second strain gauge; 1-4. fourth strain gauge; 2. roll angle sensor of the vehicle body; 3. alarm buzzer; 4. collection control unit; 5. front axle; 6. rear axle; 7-1. left front wheel; 7-2. right front wheel; 7-3. left rear wheel; 7-4. right rear wheel.

DETAILED DESCRIPTION

The existing anti-rollover protection technology for the cab of the construction machinery is mainly aimed at the safety protection of the cab and the driver when the construction machinery is subjected to a rollover accident. At this time, the rollover accident inevitably causes damage to the construction machinery and the cab, and the driver is also physically injured to a certain extent. The existing anti-rollover technology can only guarantee the basic secondary use of the construction machinery and the basic survival of the driver after the rollover accident, but cannot provide rollover alarming for the construction machinery so as to prevent damage to the entire vehicle and different degrees of injury to the driver.

It is an object of the present disclosure to provide a rollover alarming system, a rollover risk prediction method and a rollover alarming method, so as to solve the above-described problems existing in the background art.

The beneficial effects of the present disclosure are as follows:

The present disclosure provides a rollover alarming system, a rollover risk prediction method, and a rollover alarming method. The axle housing strain measurement unit measures strain values on both sides of the axle housing of the vehicle body, and the roll angle measurement unit measures a roll angle of the vehicle body. The collection control unit is configured to collect the strain values on both sides of the axle housing of the vehicle body and the roll angle of the vehicle body, calculate a strain difference between the strain values according to the strain values on both sides of the axle housing of the vehicle body, and output a corresponding alarm control signal according to the strain difference between both sides of the axle housing of the vehicle body and the roll angle of the vehicle body. The alarm unit is configured to output a corresponding alarm signal according to the received alarm control signal, so as to inform the driver of protection from danger of rollover and take corresponding protective measures in advance. At the same time, the present disclosure is constituted in a simple structure and a low cost.

The present disclosure will be further described in detail below in conjunction with the accompanying drawings.

It should be noted that, all directional indications (such as up, down, left, right, front, back . . . ) in the embodiments of the present disclosure are only intended to explain the relative positional relationships, movement conditions and the like among various components in a specific attitude (as shown in the accompanying drawings). If this particular attitude varies, the directional indications also vary along the same accordingly. In addition, the terms "mounted", "provided", "having", "connecting", "connected", and "socketed" should be understood in a broad sense. For example, it may be a fixed connection, a detachable connection, or an integral construction; it may be a mechanical connection or an electrical connection; it may be directly connected, or indirectly connected through an intermediate medium, or communication between two devices, elements, or constituent parts. For those of ordinary skill in the art, the specific meanings of the above-described terms in the present application may be understood according to specific circumstances.

Figure 2:
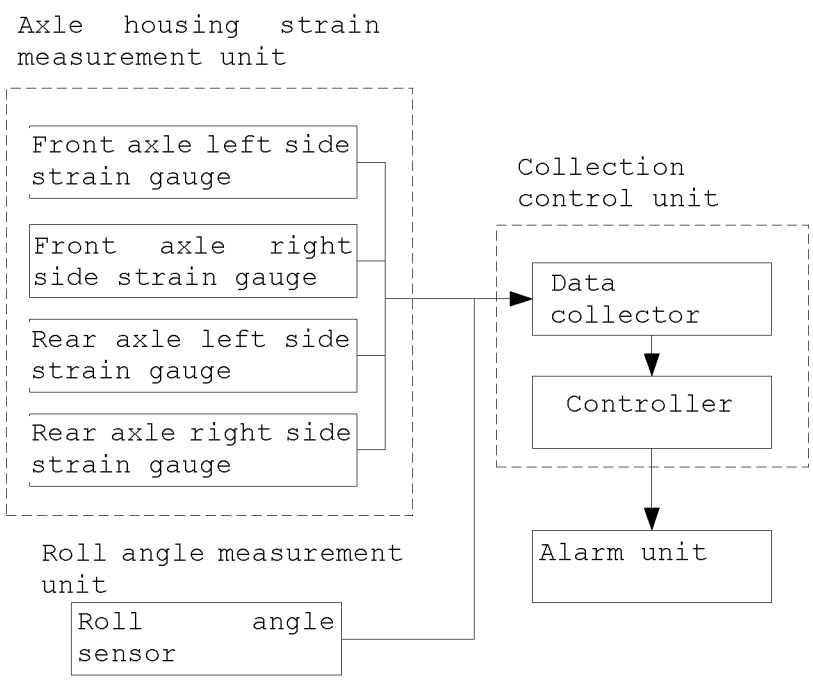
FIG. 2 is a structural block view of the rollover alarming system provided according to embodiments of the present disclosure.
Figure 3:
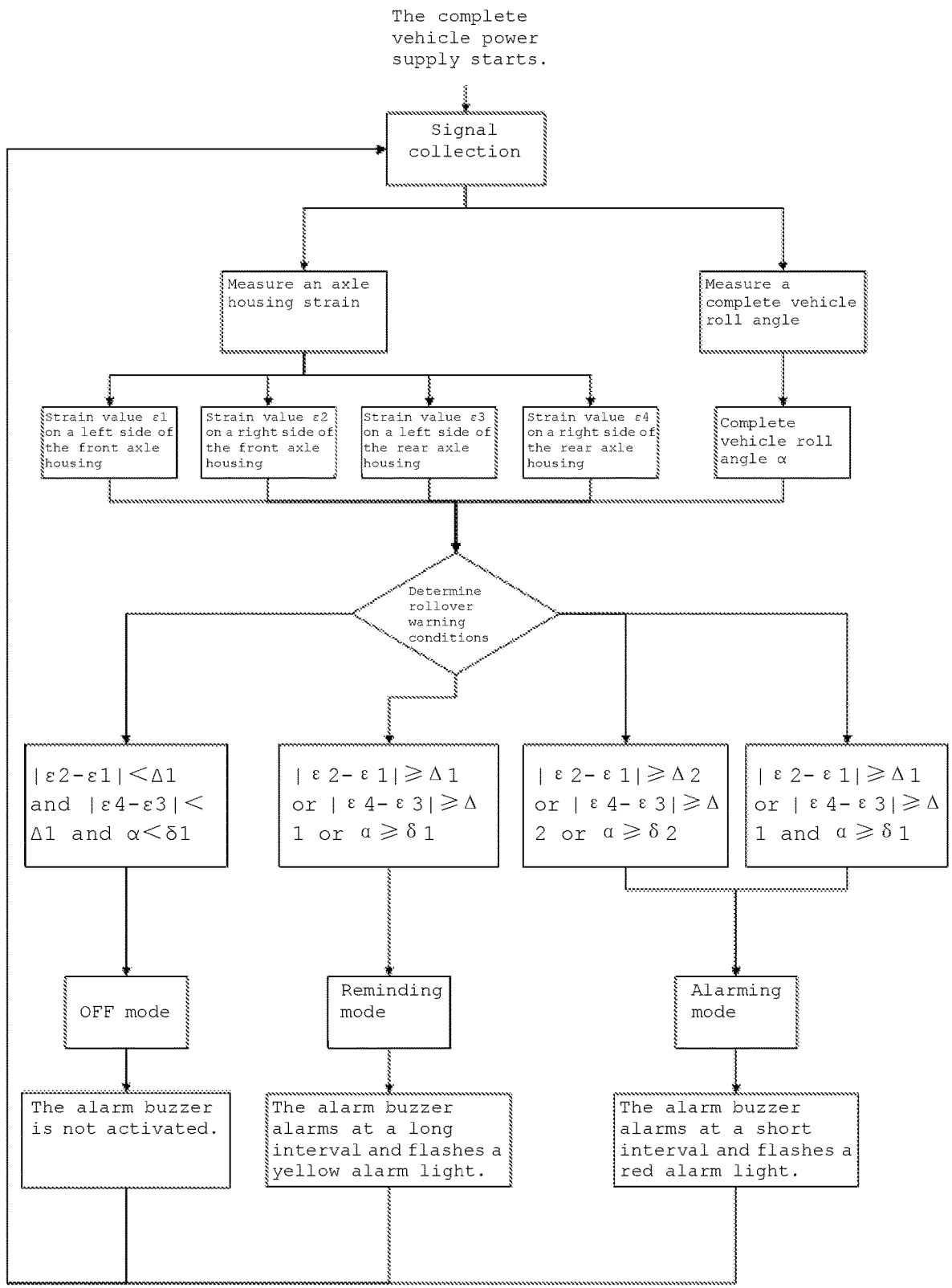
FIG. 3 is a flowchart of the rollover alarming method provided according to embodiments of the present disclosure.

As shown in FIGS. 1, 2, and 3, the present disclosure provides a rollover alarm system for construction machinery, which comprises an axle housing strain measurement unit, a roll angle measurement unit, a collection control unit, and an alarm unit. The axle housing strain measurement unit is configured to measure strain values on both sides of the axle housing of the vehicle body, and the roll angle measurement unit is configured to measure a roll angle of the vehicle body. The collection control unit is configured to collect the strain values on both sides of the axle housing of the vehicle body and the roll angle of the vehicle body, calculate a strain difference between the strain values according to the strain values on both sides of the axle housing of the vehicle body, and output a corresponding alarm control signal according to the strain difference between both sides of the axle housing of the vehicle body and the roll angle of the vehicle body. The alarm unit is configured to output a corresponding alarm signal according to the received alarm control signal.

The axle housing strain measurement unit comprises strain gauges fixedly mounted on both sides of the axle housing. The strain gauges which are adhesively fixed on the axle housing, comprise a first strain gauge 1-1, a second strain gauge 1-2, a third strain gauge, and a fourth strain gauge 1-4, which are mounted on a left side of the front axle housing, a right side of the front axle housing, a left side of the rear axle housing, and a right side of the rear axle housing respectively. When the vehicle body is subjected to an overturning moment, the action forces on the left and right wheels (a left front wheel 7-1, a right front wheel 7-2, a left rear wheel 7-3, a right rear wheel 7-4) in a vertical direction vary in a way such that the action force on one side becomes larger and the action force on the other side becomes smaller. The variation in the action forces of the left and right wheels in a vertical direction bring about the variation in the structural stresses on both sides of the axle housing, and there is also a variation in the structural strains. The strain gauges mounted on both sides of the axle housing detect the stress conditions at positions where the sensors are mounted. The variation in the strain difference between both sides reflects the greatness of the overturning moment. The larger the difference between the stresses on both sides is, the greater the overturning moment will be and the greater the rollover risk will be.

The roll angle measurement unit comprises a roll angle sensor 2 of the vehicle body fixed on a main structure of the vehicle body. The roll angle sensor 2 of the vehicle body is fixed at any position of the vehicle body structure, and the structure does not move relative to the vehicle body. In this embodiment, the roll angle sensor 2 of the vehicle body is fixed on the axle housing of the rear axle 6. The greatness of the roll angle of the vehicle body reflects the included angle between the vehicle body and the horizontal plane. The greater the roll angle of the vehicle body is, the greater the roll risk will be.

As shown in FIG. 2, the collection control unit 4 comprises a data collector and a controller. The data collector is configured to collect the strain values on both sides of the axle housing of the vehicle body and the roll angle of the vehicle body, and the controller is configured to calculate a strain difference between the strain values according to the strain values on both sides of the axle housing of the vehicle body, and output a corresponding alarm control signal according to the strain difference between the strain values and the roll angle of the vehicle body.

The present disclosure also discloses a rollover prediction method for construction machinery, which comprises the following steps:

Collecting strain values on both sides of an axle housing of a vehicle body and a roll angle of the vehicle body;

Calculating a strain difference the strain values according to the strain values on both sides of the axle housing of the vehicle body; and Comparing the strain difference between the strain values and the roll angle of the vehicle body with corresponding thresholds respectively, and outputting a corresponding rollover risk prediction result according to a comparison result.

In some embodiments, the above-described step of outputting a corresponding rollover risk prediction result according to a comparison result comprises:

When $|\varepsilon 2-\varepsilon 1|<\Delta 1$ and $|\varepsilon 4-\varepsilon 3|<\Delta 1$ and $\alpha \delta 1$, there is no rollover risk;

When $|\varepsilon 2-\varepsilon 1| \geq \Delta 1$ or $|\varepsilon 4-\varepsilon 3| \geq \Delta 1$ or $\alpha \geq \delta 1$, there is a low rollover risk;

When $|\varepsilon 2-\varepsilon 1| \geq \Delta 2$ or $|\varepsilon 4-\varepsilon 3| \geq \Delta 2$ or $\alpha \geq \delta 2$ or $|\varepsilon 2-\varepsilon 1| \geq \Delta 1$ or $|\varepsilon 4-\varepsilon 3| \geq \Delta 1$ and $\alpha \geq \delta 1$, there is a high rollover risk, In the formulas: $\Delta 1$ is 10% to 20% of an average strain on the axle housing, that is, 10% to 20% of $(\varepsilon 1+\varepsilon 2+\varepsilon 3+\varepsilon 4)/4$, $\Delta 2$ is 20% to 30% of the average strain on the axle housing, that is, 20% to 30% of $(\varepsilon 1+\varepsilon 2+\varepsilon 3+\varepsilon 4)/4$, $\delta 1$ is 10% to 20% of an included angle between a horizontal plane and a line connecting a vehicle body mass center and a vehicle wheel, and $\delta 2$ is 20% to 40% of the included angle between the horizontal plane and the line connecting the vehicle body mass center and the vehicle wheel, $\alpha$ is the roll angle of the vehicle body, $\varepsilon 1$ is a strain value on a left side of a front axle housing, $\varepsilon 2$ is a strain value on a right side of the front axle housing, $\varepsilon 3$ is a strain value on a left side of a rear axle housing, and $\varepsilon 4$ is a strain value on a right side of the rear axle housing.

In some embodiments, the strain gauge 1, the roll angle sensor 2 of the vehicle body, and the alarm buzzer 3 are connected to the collection control unit 4 through a data line.

In some embodiments, the step of outputting a corresponding rollover risk prediction result according to a comparison result comprises:

Outputting a vehicle rollover risk prediction result that there is no rollover risk in the case where $|\varepsilon 2-\varepsilon 1|<\Delta 1$ and $|\varepsilon 4-\varepsilon 3|<\Delta 1$ and $\alpha<\delta 1$;

Outputting a vehicle rollover risk prediction result that there is a high rollover risk in the case where at least one of $|\varepsilon 2-\varepsilon 1| \geq \Delta 2$ or $|\varepsilon 4-\varepsilon 3| \geq \Delta 2$ or $\alpha \geq \delta 2$ is satisfied, or in the case where at least one of $|\varepsilon 2-\varepsilon 1| \geq \Delta 1$ or $|\varepsilon 4-\varepsilon 3| \geq \Delta 1$ is satisfied, and $\alpha \geq \delta 1$ is satisfied; and Outputting a rollover risk prediction result that there is a low rollover risk in other cases, Wherein $\varepsilon 1$ is a strain value on a left side of a front axle housing of the vehicle body, $\varepsilon 2$ is a strain value on a right side of the front axle housing of the vehicle body, $\varepsilon 3$ is a strain value on a left side of a rear axle housing of the vehicle body, $\varepsilon 4$ is a strain value on a right side of the rear axle housing of the vehicle body, $\Delta 1=(\varepsilon 1+\varepsilon 2+\varepsilon 3+\varepsilon 4) \times k1/4$, k1 has a value range of [0.1, 0.2], $\Delta 2=(\varepsilon 1+\varepsilon 2+\varepsilon 3+\varepsilon 4) \times k2/4$, k2 has a value range of [0.2, 0.3], $\delta 1=\theta \times k3$, $\theta$ is an included angle between a horizontal plane and a plane determined by a vehicle body mass center and a vehicle wheel, k3 has a value range of [0.1, 0.2], $\delta 2=\theta \times k4$, k4 has a value range of [0.2, 0.4], and a is a roll angle of the vehicle body.

As shown in FIG. 3, the present disclosure also discloses a rollover alarming method. The prediction method comprises the following steps:

Predicting a rollover risk using the above-described rollover risk prediction method;

Not activating a warning unit if there is a rollover risk prediction result of no rollover risk;

Warning, by the warning unit, at a long interval and flashing a yellow warning light if there is a rollover risk prediction result of a low rollover risk, wherein the long interval is no less than 10 seconds; and Warning, by the warning unit, at a short interval and flashing a red warning light if there is a rollover risk prediction result of a high rollover risk, wherein the short interval is no more than 5 seconds.

The preferred implementations of the present disclosure have been described in detail above. Of course, the present disclosure may also adopt different forms from the above-described embodiments. Those skilled in the art may make equivalent variations or corresponding modifications without departing from the spirit of the present disclosure, which shall fall within the protection scope of the present disclosure.

What is claimed is:

1. A rollover alarming system, comprising:
an axle housing strain measurement unit, configured to measure strain values on both sides of an axle housing of a vehicle body;
a roll angle measurement unit, configured to measure a roll angle of the vehicle body;
a collection control unit, configured to
collect the strain values on both sides of the axle housing of the vehicle body and the roll angle of the vehicle body,
calculate a strain difference between the strain values according to the strain values on both sides of the axle housing of the vehicle body, and
output a corresponding alarm control signal according to the strain difference between both sides of the axle housing of the vehicle body and the roll angle of the vehicle body; and an alarm unit, configured to output a corresponding alarm signal according to the received alarm control signal;

wherein: if $|\varepsilon2-\varepsilon1|<\Delta1$ and $|\varepsilon4-\varepsilon3|<\Delta1$ and $\alpha<\delta1$, there is no rollover risk;

if $|\varepsilon2-\varepsilon1|\geq\Delta1$ or $|\varepsilon4-\varepsilon3|\geq\Delta1$ or $\alpha\geq\delta1$, there is a low rollover risk;

if $|\varepsilon2-\varepsilon1|\geq\Delta2$ or $|\varepsilon4-\varepsilon3|\geq\Delta2$ or $\alpha\geq\delta2$ or $|\varepsilon2-\varepsilon1|\geq\Delta1$ or $|\varepsilon4-\varepsilon3|\geq\Delta1$ and $\alpha\geq\delta1$, there is a high rollover risk, wherein: $\Delta1$ is 10% to 20% of an average strain on the axle housing, namely, 10% to 20% of $(\varepsilon1+\varepsilon2+\varepsilon3+\varepsilon4)/4$; $\Delta2$ is 20% to 30% of the average strain on the axle housing, namely, 20% to 30% of $(\varepsilon1+\varepsilon2+\varepsilon3+\varepsilon4)/4$, $\delta1$ is 10% to 20% of an included angle between a horizontal plane and a line connecting a vehicle body mass center and a vehicle wheel, and $\delta2$ is 20% to 40% of the included angle between the horizontal plane and the line connecting the vehicle body mass center and the vehicle wheel, $\alpha$ is the roll angle of the vehicle body, $\varepsilon1$ is a strain value on a left side of a front axle housing, $\varepsilon2$ is a strain value on a right side of the front axle housing, $\varepsilon3$ is a strain value on a left side of a rear axle housing, and $\varepsilon4$ is a strain value on a right side of the rear axle housing.

2. The rollover alarming system according to claim 1, wherein the axle housing strain measurement unit comprises a first strain gauge fixed to a left side of a front axle housing of the vehicle body, a second strain gauge fixed to a right side of the front axle housing of the vehicle body, a third strain gauge fixed to a left side of a rear axle housing of the vehicle body, and a fourth strain gauge fixed to a right side of the rear axle housing of the vehicle body, and the vehicle body comprises the front axle housing and the rear axle housing.

3. The rollover alarming system according to claim 1, wherein the roll angle measurement unit comprises a roll angle sensor of the vehicle body fixed on a main structure of the vehicle body.

4. The rollover alarming system of claim 3, wherein the main structure of the vehicle body comprises a rear axle housing of the vehicle body.

5. The rollover alarming system according to claim 1, wherein the collection control unit comprises:
a data collector, configured to collect the strain values on both sides of the axle housing of the vehicle body and the roll angle of the vehicle body; and
a controller, configured to calculate a strain difference between the strain values according to the strain values on both sides of the axle housing of the vehicle body, and output a corresponding alarm control signal according to the strain difference between the strain values and the roll angle of the vehicle body.

6. The rollover alarming system according to claim 1, wherein the alarm unit comprises a buzzer and an alarm light.

7. A rollover risk prediction method, comprising
collecting strain values on both sides of an axle housing of a vehicle body and a roll angle of the vehicle body;
calculating a strain difference between the strain values according to the strain values on both sides of the axle housing of the vehicle body; and
comparing the strain difference between the strain values and the roll angle of the vehicle body with corresponding thresholds respectively, and outputting a corresponding rollover risk prediction result according to a comparison result;

wherein the outputting a corresponding rollover risk prediction result according to a comparison result comprises:

if $|\varepsilon2-\varepsilon1|<\Delta1$ and $|\varepsilon4-\varepsilon3|<\Delta1$ and $\alpha<\delta1$, there is no rollover risk;

if $|\varepsilon2-\varepsilon1|\geq\Delta1$ or $|\varepsilon4-\varepsilon3|\geq\Delta1$ or $\alpha\geq\delta1$, there is a low rollover risk;

if $|\varepsilon2-\varepsilon1|\geq\Delta2$ or $|\varepsilon4-\varepsilon3|\geq\Delta2$ or $\alpha\geq\delta2$ or $|\varepsilon2-\varepsilon1|\geq\Delta1$ or $|\varepsilon4-\varepsilon3|\geq\Delta1$ and $\alpha\geq\delta1$, there is a high rollover risk, wherein: $\Delta1$ is 10% to 20% of an average strain on the axle housing, namely, 10% to 20% of $(\varepsilon1+\varepsilon2+\varepsilon3+\varepsilon4)/4$; $\Delta2$ is 20% to 30% of the average strain on the axle housing, namely, 20% to 30% of $(\varepsilon1+\varepsilon2+\varepsilon3+\varepsilon4)/4$, $\delta1$ is 10% to 20% of an included angle between a horizontal plane and a line connecting a vehicle body mass center and a vehicle wheel, and $\delta2$ is 20% to 40% of the included angle between the horizontal plane and the line connecting the vehicle body mass center and the vehicle wheel, $\alpha$ is the roll angle of the vehicle body, $\varepsilon1$ is a strain value on a left side of a front axle housing, $\varepsilon2$ is a strain value on a right side of the front axle housing, $\varepsilon3$ is a strain value on a left side of a rear axle housing, and $\varepsilon4$ is a strain value on a right side of the rear axle housing.

8. A rollover alarming method, comprising:
predicting a rollover risk using the rollover risk prediction method according to claim 7;
not activating a warning unit if there is a rollover risk prediction result of no rollover risk;
warning, by the warning unit, at a long interval and flashing a yellow warning light if there is a rollover risk prediction result of a low rollover risk, wherein the long interval is no less than 10 seconds; and
warning, by the warning unit, at a short interval and flashing a red warning light if there is a rollover risk prediction result of a high rollover risk, wherein the short interval is no more than 5 seconds.

9. A rollover risk prediction method, comprising
collecting strain values on both sides of an axle housing of a vehicle body and a roll angle of the vehicle body;
calculating a strain difference between the strain values according to the strain values on both sides of the axle housing of the vehicle body; and
comparing the strain difference between the strain values and the roll angle of the vehicle body with corresponding thresholds respectively, and outputting a corresponding rollover risk prediction result according to a comparison result:
wherein the outputting a corresponding rollover risk prediction result according to a comparison result comprises:
outputting a vehicle rollover risk prediction result that there is no rollover risk in the case where $|\varepsilon2-\varepsilon1|<\Delta1$ and $|\varepsilon4-\varepsilon3|<\Delta1$ and $\alpha<\delta1$;
outputting a vehicle rollover risk prediction result that there is a high rollover risk in the case where at least one of $|\varepsilon2-\varepsilon1|\geq\Delta2$ or $|\varepsilon4-\varepsilon3|\geq\Delta2$ or $\alpha\geq\delta2$ is satisfied, or in the case where at least one of $|\varepsilon2-\varepsilon1|\geq\Delta1$ or $|\varepsilon4-\varepsilon3|\geq\Delta1$ is satisfied, and $\alpha\geq\delta1$ is satisfied; and
outputting a rollover risk prediction result that there is a low rollover risk in other cases,
wherein $\varepsilon1$ is a strain value on a left side of a front axle housing of the vehicle body, $\varepsilon2$ is a strain value on a right side of the front axle housing of the vehicle body, $\varepsilon3$ is a strain value on a left side of a rear axle housing of the vehicle body, $\varepsilon4$ is a strain value on a right side of the rear axle housing of the vehicle body, $\Delta1=(\varepsilon1+$ ε2+ε3+ε4)×k1/4, k1 has a value range of [0.1,0.2], Δ2=(ε1+ε2+ε3+ε4)×k2/4, k2 has a value range of [0.2, 0.3], δ1=θ×k3, θ is an included angle between a horizontal plane and a plane determined by a vehicle body mass center and a vehicle wheel, k3 has a value range of [0.1,0.2], δ2=θ×k4, k4 has a value range of [0.2, 0.4], and a is the roll angle of the vehicle body.

10. A rollover alarming method, comprising:

predicting a rollover risk using the rollover risk prediction method according to claim 9;

not activating a warning unit if there is a rollover risk prediction result of no rollover risk;

warning, by the warning unit, at a long interval and flashing a yellow warning light if there is a rollover risk prediction result of a low rollover risk, wherein the long interval is no less than 10 seconds; and warning, by the warning unit, at a short interval and flashing a red warning light if there is a rollover risk prediction result of a high rollover risk, wherein the short interval is no more than 5 seconds.

* * * * *